(12) United States Patent
Rad et al.

(10) Patent No.: US 8,568,812 B2
(45) Date of Patent: Oct. 29, 2013

(54) LOW-EMISSION DRYING OF SUGAR BEET CHIPS

(75) Inventors: Mohsen Ajdari Rad, Obrigheim (DE); Stefan Frenzel, Weinheim (DE); Azar Shahidizenouz, Obrigheim (DE)

(73) Assignee: Sudzucker Aktiengesellschaft Mannheim/Ochsenfurt, Mannheim (DE)

( * ) Notice: Subject to any disclaimer, the term of this patent is extended or adjusted under 35 U.S.C. 154(b) by 1090 days.

(21) Appl. No.: 12/162,434

(22) PCT Filed: Jan. 26, 2007

(86) PCT No.: PCT/EP2007/000672
§ 371 (c)(1),
(2), (4) Date: Nov. 26, 2008

(87) PCT Pub. No.: WO2007/085467
PCT Pub. Date: Aug. 2, 2007

(65) Prior Publication Data
US 2010/0178403 A1    Jul. 15, 2010

(30) Foreign Application Priority Data
Jan. 28, 2006  (DE) .......................... 10 2006 004 103

(51) Int. Cl.
*A23J 1/00*    (2006.01)
*C13B 20/00*   (2011.01)

(52) U.S. Cl.
USPC ............................................ 426/465; 127/50

(58) Field of Classification Search
None
See application file for complete search history.

(56) References Cited

U.S. PATENT DOCUMENTS

| 2,071,776 A | 2/1937 | Teatini |
| 4,273,590 A * | 6/1981 | Cronewitz et al. ............. 127/44 |
| 2008/0017187 A1 * | 1/2008 | Deneus et al. .................... 127/9 |

FOREIGN PATENT DOCUMENTS

| AT | 145083 A1 | 3/1936 |
| BE | 1006318 | 7/1994 |
| DE | 470797 | 8/1937 |
| DE | 1590068 | 5/1981 |
| DE | 3028366 | 2/1982 |
| DE | 3206518 | 9/1983 |
| DE | 3319284 A1 * | 11/1984 |
| DE | 600 07 585 T2 | 11/2004 |
| DE | 103 50 672 A1 | 6/2005 |
| EP | 0058651 | 8/1982 |
| EP | 1 063 303 A1 | 12/2000 |
| GB | 4707979 A * | 8/1937 |
| WO | WO 2005042787 A1 * | 5/2005 |

* cited by examiner

*Primary Examiner* — Humera Sheikh
*Assistant Examiner* — Subbalakshmi Prakash
(74) *Attorney, Agent, or Firm* — Dickstein Shapiro LLP

(57) ABSTRACT

The present invention relates to an improved method of drying the extracted beet chips and means and equipment for carrying out the method, with emphasis especially on the reduction of the emission of organic carbon compounds during the chip drying stage and on the reduction of the primary energy consumption.

16 Claims, 4 Drawing Sheets

LOW-EMISSION DRYING OF SUGAR BEET CHIPS

The present invention relates to the technical field of processing sugar beets, in particular the extraction of sucrose and the utilization of the resulting sugar beet chips in the production of dry feedstuff. The subject matter of the present invention relates to an improved method of drying the extracted beet chips as well as to means and equipment for carrying out the method, with special emphasis on reducing the emission of organic carbon compounds while the chips are being dried as well as on reducing the primary energy consumption.

In the production of sugar, sugar beets are harvested, washed and processed in sugar beet cutting machines to form chips which, as a rule, have the thickness of a pencil. The beet chips are subsequently extracted with hot water (65 to 75° C.), generally in countercurrent and primarily using the diffusion process. This results in extracted sugar beet chips and sugar-containing raw sugar beet juice.

The raw sugar beet juice is subjected to so-called juice purification or extract purification, during which the raw juice is, as a rule, alkalized with milk of lime so as to remove the nonsucrose substances from the raw juice and to stop especially the enzymatic and acid-catalyzed sucrose breakdown. The nonsucrose substances are coagulated and precipitated and subsequently separated from the raw juice by means of mechanical and/or physical separating methods and optionally concentrated.

Juice purification generally comprises a pre-liming stage and at least one main liming stage, followed by at least one carbonatation stage and optionally a second or more carbonatation stages. The product obtained from the juice purification process is a clear, light-yellow sugar-containing juice, so-called thin juice; it contains approximately 15-17% sugar.

In subsequent processing stages, the thin juice is thickened by means of thermal removal of water to form a so-called thick juice with a sugar content of approximately 65-70%, which is subsequently fed into crystallizers where it is concentrated by evaporation until a viscous mass, the so-called massecuite, with a sugar content of approximately 85% forms. The crystalline sucrose-containing mass is subsequently centrifuged to obtain the white crystalline sugar and the noncrystalline molasses. If further processing is desired, the white sugar obtained is dissolved in water, which leads to sugar syrup, or it is subjected to at least one refining stage, which leads to refined sugar, for example, household sugar.

The by-product of raw sugar beet juice processing is molasses. It contains approximately 50% of sucrose in noncrystalline form which is generally not subjected to crystallization. To obtains additional sucrose from the molasses, molasses extract can be used. In addition, molasses contains other plant constituents of the sugar beet, such as vitamins and minerals, and other nonsucrose substances, such as pigments.

The extracted sugar beet chips consist primarily of the cell wall and fiber constituents of the extracted beet. In a subsequent processing stage, the beet chips are generally further dewatered by pressing them in the so-called pulp presses, which leads to the so-called pressed chips and the released press water. Optionally, so-called pressing aids which make it easier to express the water from the chip material can be used. As a rule, the press water is partially or completely returned to the sugar beet extraction process.

To produce dry chips, the pressed chips are subjected to a thermal removal of the residual water, a so-called chip drying process. As commonly known, the pressed chips are dried at an elevated temperature in drying drums of a drying system, which causes the residual water and other volatile constituents contained in the pressed chips to escape. Conventional drying systems used are the so-called high-temperature drying systems for evaporation drying. In alternative drying methods, the pressed chips are indirectly dried by means of superheated steam using the fluidized-bed method.

The quantity of alkaline protein fraction added to the pressed chips is preferably approximately 0.1-0.8 kg DM (dry matter) per 100 kg of beets, most preferably 0.2-0.4 kg DM/100 kg. One principle of this invention is based on the addition of a protein-containing fraction obtained in the juice purification process stage to the pressed chips in the high-temperature drying system.

The pressed chips, mainly in the form of pellets, are used as animal feedstuff or as an additive to animal feedstuff. In most cases, the dry chips serve as substrate for the sugar-containing molasses which is normally added to the pressed chips even prior to the drying stage.

One problem that arises during chip drying is the emission of volatile organic carbon compounds. These are detected as part of the total organically bound carbon (TOC; total organic content [sic; carbon]) in the waste air (waste gas) of the drying system. The TOC load of the waste gases of a drying system should be as low as possible. In the emission control of sugar-producing plants, the TOC load in the waste gases of the drying system plays an important role. According to the current directives, beginning in 2010, the maximum TOC emission may not exceed 0.8 kg of TOC (equal to 0.08 ppm) per 1 metric ton of beets. With the known high-temperature drying systems currently in use in most of the sugar-producing plant, it is impossible to maintain this threshold value. It is therefore necessary to reduce the TOC load in the waste air of chip drying systems. At the same time, it would be desirable if it were possible to develop measures for reducing the TOC load which can be implemented without major capital investments in already existing drying systems of the sugar-producing plants.

The technical problem to be solved by the present invention is to make available an improved method for drying sugar beet chips, with special emphasis on reducing the release of total organic carbon (TOC) in the chip drying process and the primary energy consumption.

The present invention solves this technical problem by making available a method of drying extracted beet chips. Specifically, after extraction, the beet chips are pressed in a first step (a) to obtain pressed chips, and the press water resulting in this stage is discharged. In the preferably immediately following step (b) according to the present invention, an alkaline colloid fraction, which is preferably the nonsucrose fraction that was separated during juice purification from the raw sugar beet juice, is added or metered to the pressed chips. According to the present invention, the alkaline colloid fraction is a protein-containing fraction with colloid constituents. According to the present invention, this fraction is used as an auxiliary processing agent in the chip drying stage. In a preferably immediately following step (c), the pressed chips which are interspersed with the colloid fraction are dried.

In step (b), the colloid fraction, in combination with the sugar-containing molasses which forms during the extraction of sugar from raw sugar beet juice, in particular during the centrifugation of white sugar, is preferably added. In an alternative embodiment, the colloid fraction is added to the chip pulp prior to the mechanical pressing of the extracted beet chips.

Thus, the objective of the present invention is to add the alkaline colloid-containing fraction which is preferably separated from the raw juice, optionally in combination with the molasses, to the pressed chips prior to the actual drying stage and subsequently to dry the chips. The inventors discovered to their surprise that by using the alkaline colloid fraction as a technical auxiliary agent in the chip drying stage, it is possible to reduce the TOC fraction in the waste air of the chip drying system drastically, which means by approximately 50%, compared to the fraction in the traditional chip drying stage. Furthermore, it was surprisingly found that the fraction of sulfur oxides, in particular $SO_2$, in the waste air of the chip drying system can also be significantly reduced. In addition, it was discovered that the so-called drum entry temperature can be reduced. The inventors also found that the dry matter content of the dry chips obtained can be markedly increased by means of the method according to the present invention: It was found that the water evaporation increased by an additional 18%, which leads to an increase in the dry matter content by approximately 3-4%. This means that the effectiveness of the known prior-art chip drying stage is markedly improved. The resultant advantage is that it is possible to adjust, i.e., to reduce, the drum entry temperature. This translates into energy savings. The primary energy savings amount to approximately 9% (kwh per metric ton of dry matter). Secondarily, the TOC load in the waste gas of drying systems depends directly on the drum entry temperature and the drying temperature: the TOC load in the waste air is reduced at a lower drum entry temperature. Thus, very surprisingly, the addition of the colloid fraction has a direct effect on the TOC release, especially because of the chemical effects described above. An additional indirect effect is the increase in the effectiveness of the drying process, which can be used to reduce the drum entry temperature and, associated with this, to an additional reduction of the TOC load in the waste air. The direct and the indirect effect are additive.

Thus, the present invention makes it possible for the chip drying process to be carried out in conventional chip drying systems, i.e., in high-temperature chip drying systems, at a markedly decreased TOC emission so that it will be possible to reach the TOC emission threshold values that will become effective in 2010 and to ensure that the TOC emission is kept below these values. In particular, it will be possible to continue to operate already existing sugar beet processing plants economically while making only slight constructional modifications.

In the context of the present invention, the term "alkaline colloid fraction" or colloid-containing fraction is defined as principally the alkaline nonsucrose concentrate which is separated from the raw sugar beet juice and which can comprise mainly high-molecular and especially colloidal proteins and also polysaccharides, cell wall constituents and salts of low-molecular organic and inorganic acids, amino acids and/or mineral substances. In addition, the colloid fraction optionally contains the calcium ions contained in the pre-liming juice which are present in various forms, actively mainly in the form of calcium hydroxide and passively in the form of sparingly soluble calcium salts. "Nonsucrose substances" are defined as the primarily high-molecular substances, such as proteins, polysaccharides and cell wall constituents as well as low-molecular organic compounds, such as inorganic or organic acids and their salts, amino acids and other mineral substances. The cell wall constituents are mainly pectins, lignin, cellulose and hemicellulose. Like the proteins which also include especially the nucleoproteids, these substances are present as hydrophilic macromolecules in colloidal disperse form. Organic acids include, for example, lactate, citrate and oxalate. The inorganic acids include especially sulfates and phosphates. Most preferably, the fraction comprises starch-based colloids, cellulose-based colloids, pectin-based colloids, hemicellulose-based colloids, lignin-based colloids, protein colloids and/or mixtures of the above.

Without being restricted to theory, the colloid-containing and alkaline nonsucrose fraction used according to the present invention leads to the neutralization of the volatile organic acids which are present in the pressed chips and which form during conventional prior-art processes while the pressed chips are being dried, in particular at elevated drum entry temperatures, and which pass into the waste gases. Without being restricted to theory, dehydration effects develop as a result of the colloid constituents of the fraction in combination with the alkalinity, which effects cause water to be drawn out of and to the surface of the pressed chips (hygroscopic effect). From the surface, the water is able to evaporate more readily. Thus, the process of thermal drying is facilitated, and its effectiveness is markedly improved. Surprisingly, this dehydration effect of the colloids, in combination with the alkalization effects, leads to a superadditive synergistic effect. The alkaline shift (typically from approximately pH 5.5 to approximately pH 9) that occurs as the colloid fraction is added changes the charge state of the colloids. This has a direct influence on the dehydration/hydration behavior of the colloids so that the elimination of the hydrate envelope (water) is considerably simplified. This effect came as a complete surprise and could not have been anticipated.

It is, of course, obvious that the method according to the present invention will be combined with other known measures for reducing the TOC emission. Among these are, in particular, indirect drying in a closed system by means of superheated steam and/or the subsequent purification of the waste air generated in the drying stage, for example, by means of centrifugal force separators (cyclones), wet scrubbers and/or chemical scrubbers.

The alkaline colloid fraction is preferably obtained from the pre-liming juice in the juice purification stage. It can be carried out in the course of the juice purification stage during or after the pre-liming stage. The alkaline colloid fraction is preferably obtained in the course of the juice purification stage prior to the main liming stage by separating the fraction from the raw juice. The alkaline colloid fraction is preferably separated from the raw juice by precipitation and/or coagulation of the proteins. Optionally, a mechanical and/or physical separation is carried out, preferably during or after concluded precipitation and/or coagulation of the colloids, in order to separate the colloidal protein-containing fraction. Precipitation, which is preferred, leads to a so-called precipitation and/or coagulation sludge which contains the alkaline colloid fraction used according to the present invention. The separation is preferably carried out using at least one unit, selected from static decanters, centrifugal decanters, disk centrifuges, disk separators and membrane filter presses or combinations of the above. Preferably, a centrifugal decanter is used to separate the colloid-containing fraction from the pre-liming juice.

To support the precipitation and/or coagulation of the colloid fraction, preferably at least one auxiliary precipitating agent is added. The flocculation aid is preferably selected from the group of polyanionic flocculation aids. These include preferably polyanionic polysaccharides and polyacrylic-based polysaccharides. In one embodiment, the flocculation aids are selected from the group of acrylamides and from copolymers of acrylamide and sodium acrylate and mixtures of the above. Especially preferred are flocculation aids based on derivative starch or cellulose. Preferably, these are alkoxylated starch, alkoxylated cellulose, and carboxymethylated starch and carboxymethylated cellulose. The flocculation aid is preferably added in a quantity of 1-8 ppm, preferably in a quantity of 2-3 ppm. Preferably the flocculation aid has a mean relative molar mass of 5 million to 22 million g/mol. The flocculation aid is added in the course of the juice purification stage prior to, during and/or after the pre-liming stage. It is preferably added after the pre-liming stage.

The dry chips obtained by means of the method according to the present invention are preferably used as animal feedstuff or as an ingredient in animal feedstuff. Therefore, the present invention also relates to an improved method of producing animal feedstuff or an ingredient in animal feedstuff from extracted sugar beet chips, which method is characterized by the procedures described above. The animal feedstuff preferably comprises the dried beet chips according to the present invention, a quantity of the alkaline colloid fraction which is added as a technical auxiliary agent according to the present invention to the chip drying stage and optionally added molasses. The animal feedstuff produced according to the present invention thus comprises solely by-products of the sugar production process.

Another subject matter of the present invention relates to the use of the alkaline colloid fraction described above for improving the chip drying stage, in particular for increasing the effectiveness of the chip drying stage, for increasing the dry matter content of the dried chips, for decreasing the drum entry temperature, for decreasing the TOC emission in the waste air of the chip drying stage and for decreasing the dust emission. Preferably the use according to the present invention includes the method according to the present invention as described above.

Yet another subject matter of the present invention relates to a system for the improved drying of extracted sugar beet chips, a beet chip drying system which is derived from prior-art sugar beet processing system for the production of sucrose and dried chips. According to the present invention, the beet chip drying system comprises a metering device for metering the alkaline colloid fraction which is preferably separated during the juice purification stage into the pressed chips to be dried. The system is preferably characterized in that a conventional juice purification stage is included, which, according to the present invention is connected, preferably via a secondary flow circuit, with a conventional chip drying system in such a manner that an alkaline colloid fraction which can be separated during the juice purification stage can be metered as a constituent of the separable nonsucrose concentrate into the pressed chips before or while said pressed chips are fed into the chip drying system according to the present invention. Specifically, the system according to the present invention makes it possible to carry out the method according to the present invention described above. This system preferably comprises at least the following elements: A juice purification stage for purifying the extract of raw sugar beet juice, preferably comprising a pre-liming stage and at least one main liming stage, in which an alkaline colloid fraction can be separated from the raw juice; and a chip drying stage with a drying drum for drying the extracted beet chips, with a metering device for metering the colloid-containing fraction into the chips to be dried, with the chip drying stage comprising a metering device for metering the colloid-containing fraction into the chips to be dried, and with the juice purification stage being connected with the chip drying stage by means of a flow circuit, optionally via an intermediate tank or a storage tank, in such a manner that the colloid-containing fraction can be transferred from the juice purification stage, optionally via intermediate storage containers and/or intermediate stages, into the metering device of the chip drying stage. The metering device is disposed preferably directly upstream of the drying drum of the chip drying stage. In one embodiment, an intermediate storage area, for example, a bunker, and/or one or more intermediate stages are disposed between the metering device and the drying drum.

The juice purification stage preferably comprises at least one unit for the mechanical/physical separation of the alkaline colloid-containing fraction from the pre-liming juice. This unit is preferably selected from the group of: static decanters, centrifugal decanters, disk centrifuges, disk separators and membrane filter presses and combinations of the above. The separating unit can be implemented partially or completely downstream of the pre-liming stage.

PRACTICAL EXAMPLES

The invention will be explained in greater detail based on the following figures and examples, without however intending to limit the invention to said figures and examples. The person skilled in the art will consider variations and modifications of the present invention that are obvious to him as part of the teaching of the invention.

FIG. 1 is a graph representing the dry matter content (in %) of the dry chips obtained over the course of an experiment in which an alkaline colloid fraction (alkaline protein fraction) and/or an alkaline colloid fraction in combination with molasses is/are added as disclosed by the present invention: the 1 h time slot shows the zero state without the metered-in fraction; beginning at the 2 h time slot, the significant effect of the metered-in fraction according to the present invention on the dry matter content can be seen; and as the metering in of the fraction ends, the values return to normal.

FIG. 2 is a graph representing the increase in the water evaporation in the course of an experiment in which an alkaline colloid fraction (protein fraction) in combination with molasses is added as disclosed by the present invention: the 1 h time slot shows the zero state without the metered-in fraction; beginning at the 2 h time slot, the significant effect of the metered-in fraction according to the present invention on the water evaporation can be seen; and as the metering in of the fraction ends, the values return to normal.

EXAMPLE

Low-Emission Drying of Sugar Beet Chips

Figure 1:
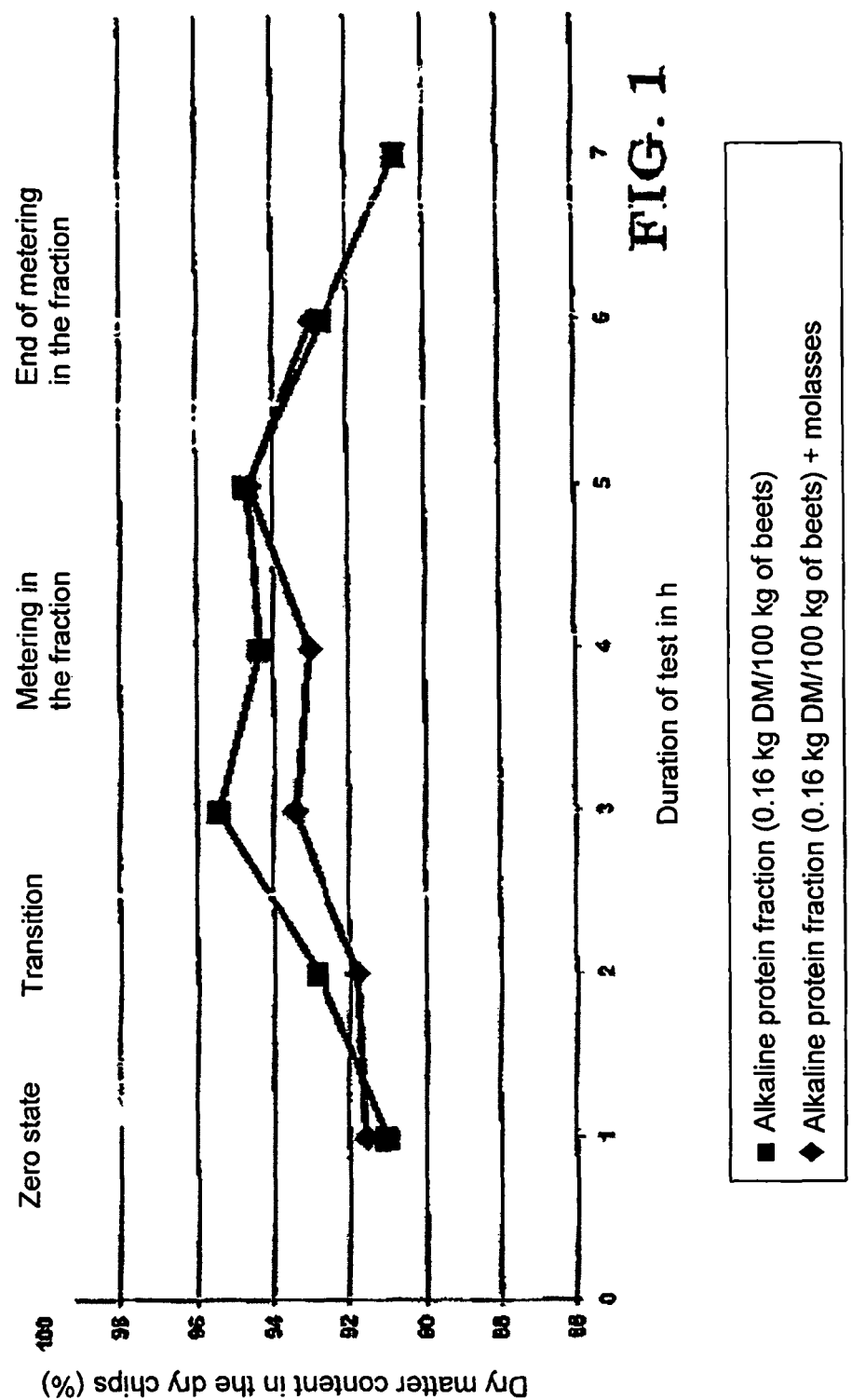
Figure 2:
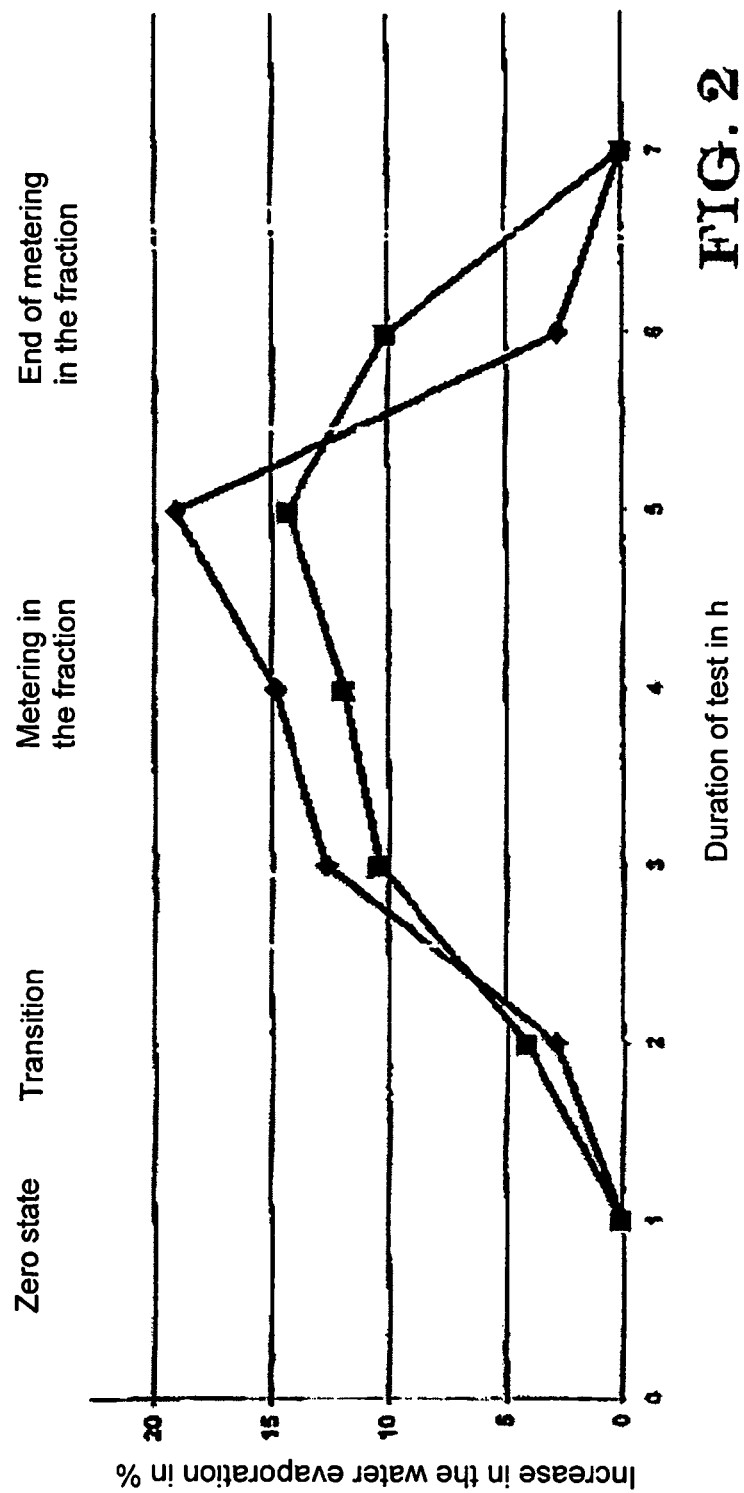
Figure 3:
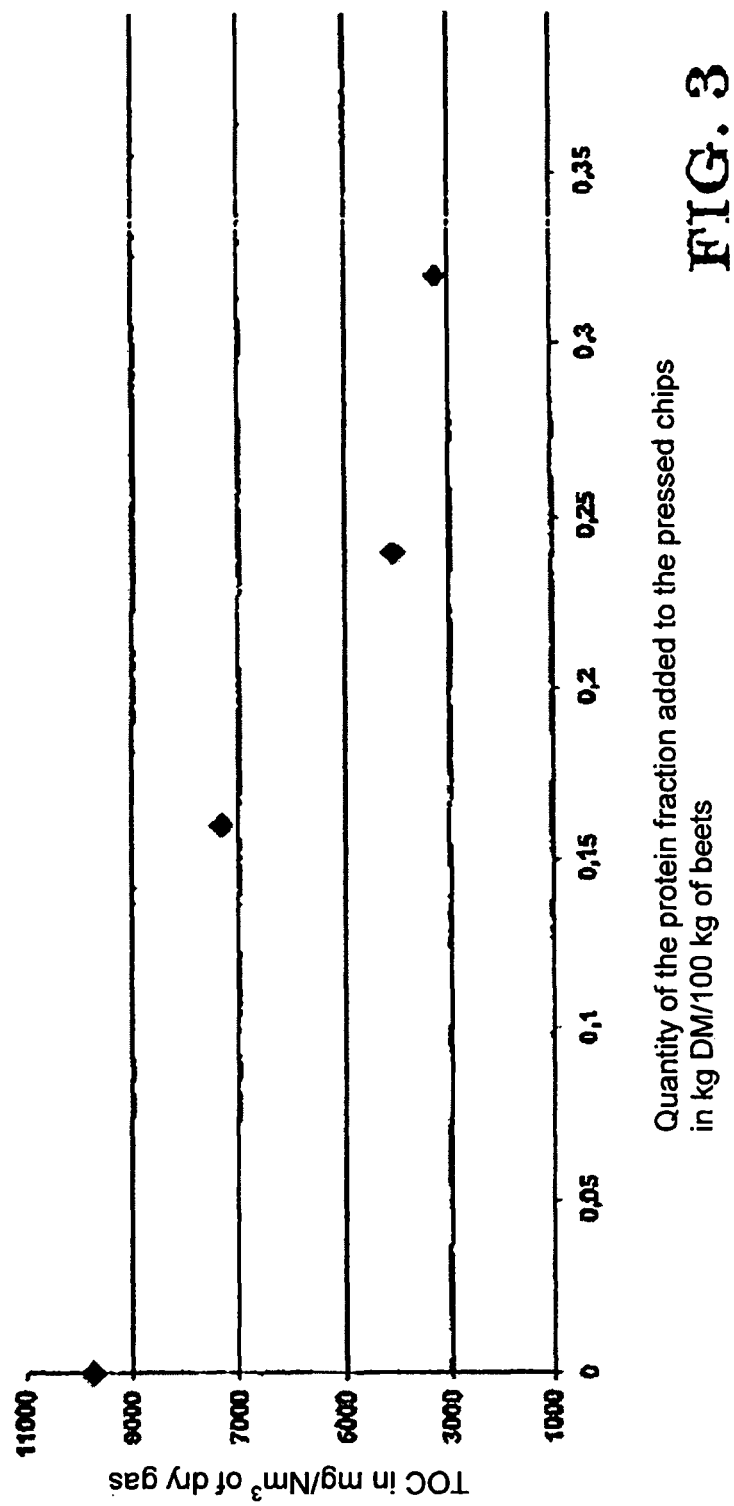
FIG. 3 is a graph representing the TOC emission as a function of the quantity of the added alkaline colloid fraction (protein fraction).
Figure 4:
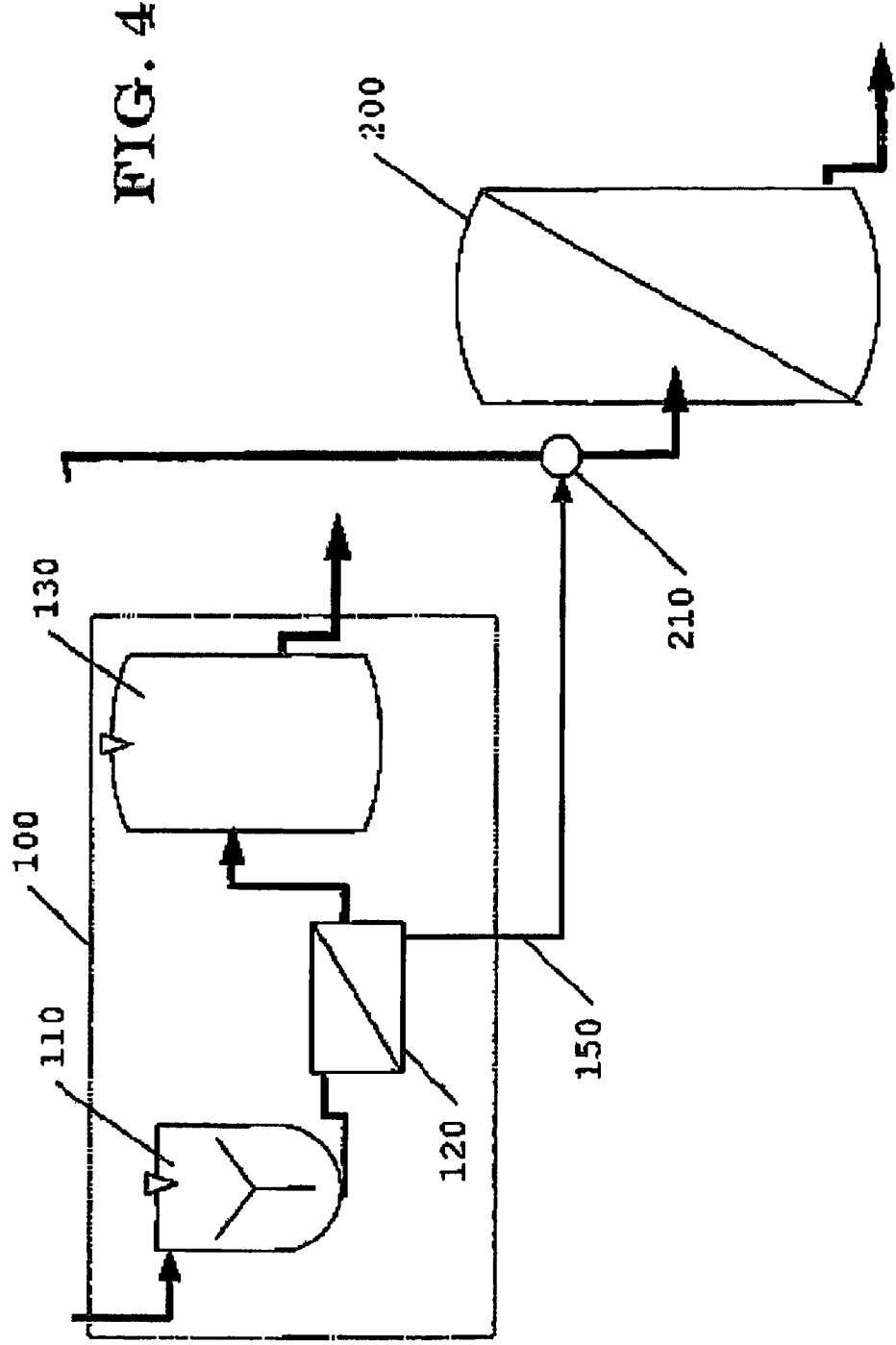
FIG. 4 is a schematic representation of a preferred embodiment of the system according to the present invention, comprising a juice purification stage (100) with a pre-liming stage (110), a main liming stage (130), a separating unit (120) and a feed line (150) as well as a chip drying stage (200) with a metering device (210).

During the sugar production process in a sugar-producing plant, the alkaline colloid-containing nonsucrose fraction, which was separated in the juice purification stage by means of a centrifugal decanter, was added at a metering point having a metering screw and being installed upstream of the drying drum to the pressed chips shortly before said pressed chips are fed into the drying drum.

The drying experiments were carried out with different quantities of the colloid fraction. Quantities beginning with 0.1 kg DM per 100 kg of beets were added. In some experiments, the colloid fraction in combination with molasses was added to the pressed chips. Drying was carried out by conventional means.

It was found that the dust content in the waste gases of the drying system was significantly reduced.

It was found that the content of volatile organic carbon compounds in the waste gases of the drying system was significantly reduced by up to 50%. The maximum reduction in the test series performed was observed at quantities of 0.2-0.4 kg DM per 100 kg of beets. For example, compared to the reference value of 0.095 kg of TOC per metric ton of beets, the TOC load in the waste gas was reduced to 0.070 when 0.40 [kg of dry matter per 100 kg of beets] was added. An increase in the quantity of the alkaline colloid fraction added in excess of 0.8 kg DM per 100 kg has a deteriorating effect.

It was found that the $SO_2$ content in the waste gases of the drying system was significantly reduced. In the test series performed, the maximum reduction was observed at quantities of 0.2-0.4 kg DM per 100 kg of beets.

After an addition of the alkaline colloid fraction (with or without molasses) with a quantity of 0.16 kg DM per 100 kg of beets, it was found that the water evaporation had increased by approximately 14-18%; the dry matter content (in absolute percent) of the dry chips is increased by 4-5 percentage points.

In experiments, it was further demonstrated that the addition of the alkaline colloid fraction can reduce the primary energy consumption, measured in kwh per metric ton (dry matter) of beets, by approximately 9%, while the same degree of dryness is achieved. The most effective dose again is in a range from 0.2-0.4 kg DM per 100 kg of beets.

COMPARISON EXAMPLE

In additional drying tests, other substances were added:
Molasses (80% DM),
Vinasses,
Molasses alkalized with milk of lime,
Molasses alkalized with NaOH,
Waste mash from the bioethanol production
None of these substances led to the significant advantageous effects achieved with the use of the colloidal alkaline fraction according to the present invention.

The invention claimed is:

1. A method of drying extracted beet chips, comprising the steps:
combining an alkaline colloid fraction which is a nonsucrose concentrate comprising starch colloids, cellulose colloids, pectin colloids, hemicellulose colloids, lignin colloids, protein colloids and mixtures thereof, with sugar extracted beet chips, wherein the quantity of alkaline colloid fraction is 0.1 to 0.8 kg dry matter per 100 kg of the sugar extracted beet chips; and
immediately drying the sugar extracted beet chips by thermal removal of residual water, wherein the energy consumption for drying of the sugar extracted beet chips is reduced relative to the energy consumption when drying the sugar extracted beet chips without employing the alkaline colloid fraction.

2. The method as in claim 1, wherein the alkaline colloid fraction is in combination with a molasses by-product of sugar extraction.

3. The method as in claim 1, wherein the alkaline colloid fraction is a nonsucrose concentrate that was separated during a juice purification of raw sugar beet juice.

4. The method as in claim 1, wherein the alkaline colloid fraction is obtained directly from raw sugar beet juice by precipitation or coagulation or both, and optionally by mechanical or physical separation or both.

5. The method as in claim 3, wherein the alkaline colloid fraction was obtained from pre-liming juice after a pre-liming stage in juice purification.

6. The method as in claim 3, wherein the alkaline colloid fraction was obtained prior to a main liming stage in juice purification.

7. The method as in claim 4, wherein the precipitation or coagulation of the alkaline colloid fraction was performed in the presence of a flocculation aid.

8. The method as in claim 3, wherein the alkaline colloid fraction is a fraction which was separated by at least one unit selected from the group consisting of static decanters, centrifugal decanters, disk centrifuges, disk separators and membrane filter presses.

9. The method as in claim 4, wherein the alkaline colloid fraction was obtained prior to a main liming stage in juice purification.

10. The method as in claim 5, wherein the alkaline colloid fraction was obtained prior to a main liming stage in juice purification.

11. The method as in claim 5, wherein the precipitation or coagulation of the alkaline colloid fraction was performed in the presence of a flocculation aid.

12. The method as in claim 6, wherein the precipitation or coagulation of the alkaline colloid fraction was performed in the presence of a flocculation aid.

13. The method as in claim 4, wherein the alkaline colloid fraction is a fraction which was separated by at least one unit selected from the group consisting of static decanters, centrifugal decanters, disk centrifuges, disk separators and membrane filter presses.

14. The method as in claim 5, wherein the alkaline colloid fraction is a fraction which was separated by at least one unit selected from the group consisting of static decanters, centrifugal decanters, disk centrifuges, disk separators and membrane filter presses.

15. The method as in claim 6, wherein the alkaline colloid fraction is a fraction which was separated by at least one unit selected from the group consisting of static decanters, centrifugal decanters, disk centrifuges, disk separators and membrane filter presses.

16. The method as in claim 7, wherein the alkaline colloid fraction is a fraction which was separated by at least one unit selected from the group consisting of static decanters, centrifugal decanters, disk centrifuges, disk separators and membrane filter presses.

* * * * *

UNITED STATES PATENT AND TRADEMARK OFFICE
CERTIFICATE OF CORRECTION

PATENT NO. : 8,568,812 B2  Page 1 of 1
APPLICATION NO. : 12/162434
DATED : October 29, 2013
INVENTOR(S) : Rad et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1212 days.

Signed and Sealed this

Fifteenth Day of September, 2015

Michelle K. Lee
*Director of the United States Patent and Trademark Office*